US012654468B2

(12) United States Patent
Connell et al.

(10) Patent No.: US 12,654,468 B2
(45) Date of Patent: Jun. 16, 2026

(54) FOOD PRODUCT SCALE AND ASSOCIATED LABEL STOCK CASSETTE AND SUPPLY ROLL HUB FOR USE WITH DIFFERENT LABEL STOCK ROLL CORE SIZES

(71) Applicant: ILLINOIS TOOL WORKS INC., Glenview, IL (US)

(72) Inventors: Hugh A. Connell, Evesham (GB); Robert Andrew Holmes, Worcester (GB); Ian D. Taylor, Warwickshire (GB); Austin Knoblauch, Centerville, OH (US); Randall L. Redman, Beavercreek, OH (US); Kevin Cartwright, Halesowen (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/756,845

(22) Filed: Jun. 27, 2024

(65) Prior Publication Data

US 2026/0001350 A1     Jan. 1, 2026

(51) Int. Cl.
B41J 3/407          (2006.01)
B41J 15/04          (2006.01)
(Continued)

(52) U.S. Cl.
CPC ........... B41J 3/4075 (2013.01); B41J 15/044 (2013.01); G01G 19/40 (2013.01); G01G 19/52 (2013.01)

(58) Field of Classification Search
CPC ....... B41J 3/4075; B41J 15/044; G01G 19/40; G01G 19/52; B65H 75/245; B65H 75/2455
See application file for complete search history.

(56) References Cited

U.S. PATENT DOCUMENTS 1,457,572 A * 6/1923 Harnett .................... D01H 7/16
                                                   242/129.7
1,730,431 A * 10/1929 Keefer ................... D05B 43/00
                                                   242/130
(Continued)

FOREIGN PATENT DOCUMENTS

CH          327685 A  *  2/1958
CN       205311099 U     6/2016
(Continued)

OTHER PUBLICATIONS

Admitted Prior Art, 1 page.
(Continued)

*Primary Examiner* — Christopher E Mahoney
*Assistant Examiner* — Marissa Ferguson-Samreth
(74) *Attorney, Agent, or Firm* — THOMPSON HINE LLP

(57) ABSTRACT

A printer includes a label supply roll hub, a media path along which label stock is movable and a printhead positioned along the media path. The label supply roll hub comprises a hub body and at least one wireform member positioned on the hub body and configured such that at least a core engaging portion of the wireform member is pressed radially inward when engaged by a label supply roll core sliding axially onto the label supply roll hub, wherein the wireform member is configured to apply radially outward pressure against the label supply roll core after the core engaging portion is pressed radially inward.

11 Claims, 6 Drawing Sheets

(51) Int. Cl.
  G01G 19/40       (2006.01)
  G01G 19/52       (2006.01)

(56)                References Cited

U.S. PATENT DOCUMENTS

| | | | | |
|---|---|---|---|---|
| 2,562,923 A * | 8/1951 | Kolivoski | ............... | B65H 75/08 |
| | | | | 492/42 |
| 2,681,189 A * | 6/1954 | Huber | ..................... | B65H 49/06 |
| | | | | 242/129.7 |
| 3,285,528 A * | 11/1966 | Beindorf | ............... | B65H 75/245 |
| | | | | 242/571.5 |
| 3,386,673 A * | 6/1968 | Mader | ..................... | B65H 75/08 |
| | | | | 242/129.7 |
| 5,725,321 A * | 3/1998 | Brannan | ................ | B41J 15/042 |
| | | | | 242/571.5 |
| 8,517,618 B2 * | 8/2013 | Cartwright | ............... | B41J 11/46 |
| | | | | 400/613 |
| 9,642,504 B2 * | 5/2017 | Andersson | ............. | A47K 10/40 |
| 2011/0013962 A1 | 1/2011 | Montagutelli | | |
| 2012/0280077 A1 | 11/2012 | Deonarine | | |
| 2014/0117134 A1 * | 5/2014 | Weissbrod | ........... | B65D 85/672 |
| | | | | 242/118.11 |

FOREIGN PATENT DOCUMENTS

| | | | |
|---|---|---|---|
| GB | 2624373 A | | 5/2024 |
| JP | 2011131984 A | | 7/2011 |
| WO | 2022/077044 | * | 4/2022 |

OTHER PUBLICATIONS

Avery Berkel, XTi/XTs Series Service Instructions Manual, ABR35-000660-AG, Aug. 24, 2022, 95 pages.
Cartwright, Kevin et al., "A Label Printer Cassette and a Label Printer" filed on May 27, 2025, as a U.S. Appl. No. 19/219,557.

* cited by examiner

FOOD PRODUCT SCALE AND ASSOCIATED LABEL STOCK CASSETTE AND SUPPLY ROLL HUB FOR USE WITH DIFFERENT LABEL STOCK ROLL CORE SIZES

TECHNICAL FIELD

This application relates generally to scales used for weighing food product in supermarkets, groceries and other stores, and, more particularly, to a scale including a label stock cassette configurable for use with different label supply rolls having different core sizes.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight. Price can also be determined based upon item count. In either case, the food product scale typically prints a label with the price and other information for the product.

Both liner-based and linerless label types are available for use in such scales. The label stock is also available from different manufactures. This results in variations label supply roll core sizes. Similarly, other label printers might have a need handle such different label supply roll core sizes. As used herein, the term printer encompasses both devices that function solely or primarily as printers, as well as other devices that include a printer function but also include other functions in addition to printing, such as a weighing scale that also prints labels. Such scales and other printers can include label stock cassettes that are removable for the purpose of replacing or changing the label stock loaded into the cassette. The label stock cassettes commonly carry a label supply roll hub on which the roll is mounted. In the past, a label supply roll hub was provided that included moulded in arms which flexed as the roll was inserted and held the core in place. Over time, the moulded arms would take a set and no longer spring back to the unloaded position, leading to the supply roll core being loose and not gripping as the hub rotates.

It would be desirable to provide a scale (or other printer) with a label stock cassette and label supply roll hub that is more effective for use with label supply rolls having different sizes.

SUMMARY

In one aspect, a printer includes a label supply roll hub, a media path along which label stock is movable and a printhead positioned along the media path. The label supply roll hub comprises a hub body and at least one wireform member positioned on the hub body and configured such that at least a core engaging portion of the wireform member is pressed radially inward when engaged by a label supply roll core sliding axially onto the label supply roll hub, wherein the wireform member is configured to apply radially outward pressure against the label supply roll core after the core engaging portion is pressed radially inward.

In another aspect, a label supply roll hub for use in a printer, the label supply roll hub is provided and includes a hub body and at least one wireform member positioned on the hub body. The wireform member is configured such that at least a core engaging portion of the wireform member is pressed radially inward when engaged by a label supply roll core sliding axially onto the label supply roll hub, wherein the wireform member is configured to apply radially outward pressure against the label supply roll core after the core engaging portion is pressed radially inward.

The details of one or more embodiments are set forth in the accompanying drawings and the description below. Other features, objects, and advantages will be apparent from the description and drawings, and from the claims.

DETAILED DESCRIPTION

Figure 1:
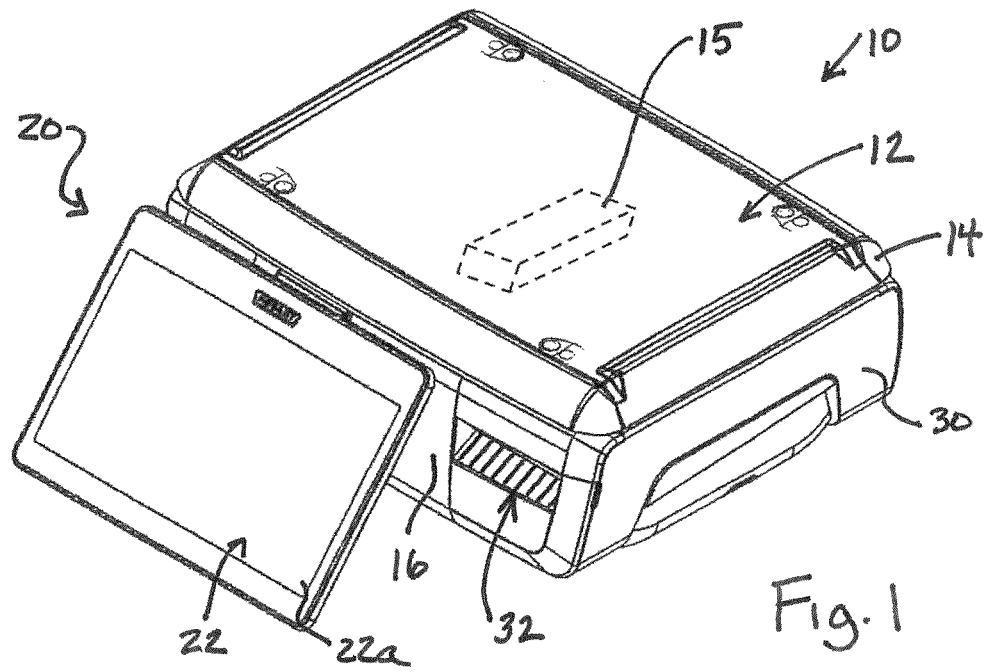
FIGS. 1 and 2 show perspective views of a scale.
Figure 2:
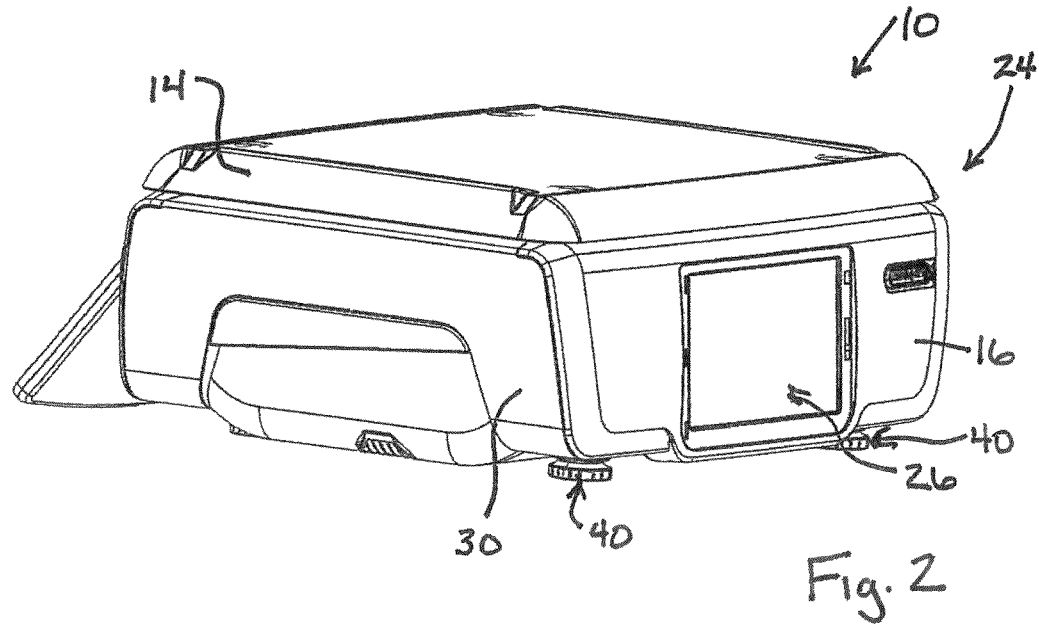
Figures 3, 4:
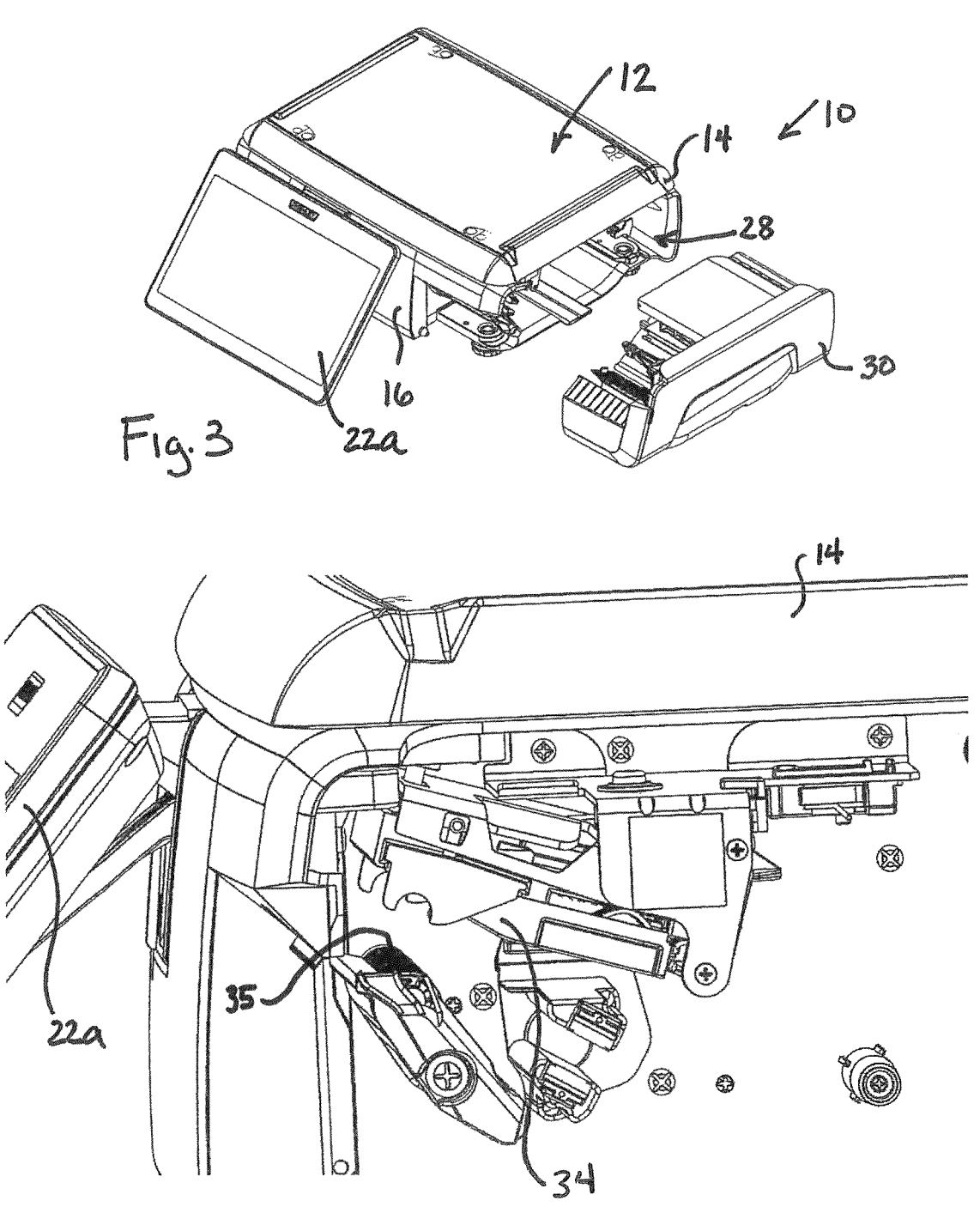
FIG. 3 shows a perspective view with label cassette removed.
FIG. 4 shows a partial perspective of a printhead region within the cassette receiving station.

Referring to FIGS. 1-12, an exemplary scale configuration is shown. The scale 10 includes a weighing station 12, which in some embodiments may be formed by a weighing platter 14 that can be removed (e.g., for cleaning) from atop the scale body 16. A platter support bracket (not shown) transfers forces to a mechanism, such as a load cell 15 located internal of the scale body 16, for producing weight indicative signals when items are placed on the weighing station. An operator interface side 20 of the scale includes an operator interface 22 configured to display information associated with scale operations. By way of example, the operator interface 22 may be formed by a touch-screen display 22a. A customer interface side 24 of the scale includes a customer interface 26, which in certain embodiments may be formed by any suitable display screen technology.

A side portion of the scale body incudes a cassette station 28 that receives a removable label stock cassette 30 that defines a label exit slot 32. A label printer (e.g., a printhead 34 with associated roller 35) is located within the scale body and may use any suitable printing technology for printing on labels of a label supply roll loaded in the cassette 30, which printed labels then exit the label exit slot 32 to be applied to products. Here, the printhead 34 is shown in a position pivoted upward, and insertion of the cassette into the cassette station causes pivot of the printhead downward toward the roller 35.

Figure 5:
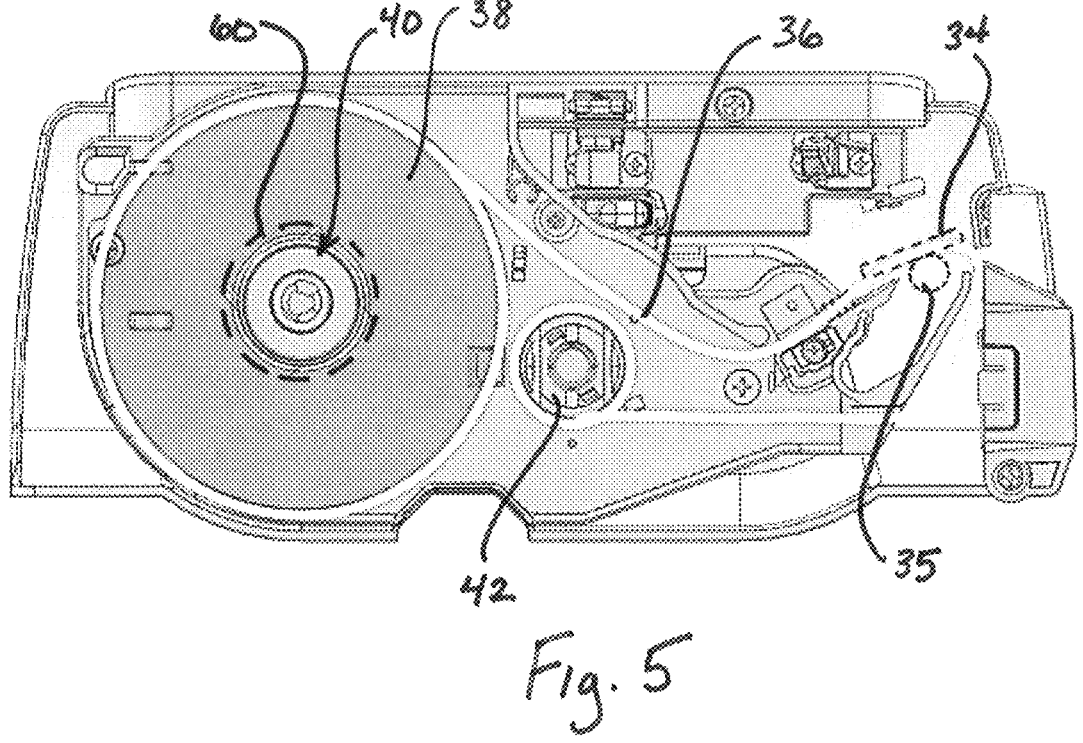
FIG. 5 shows a side elevation depicting the path of a liner-based label stock through the cassette.
Figure 6:
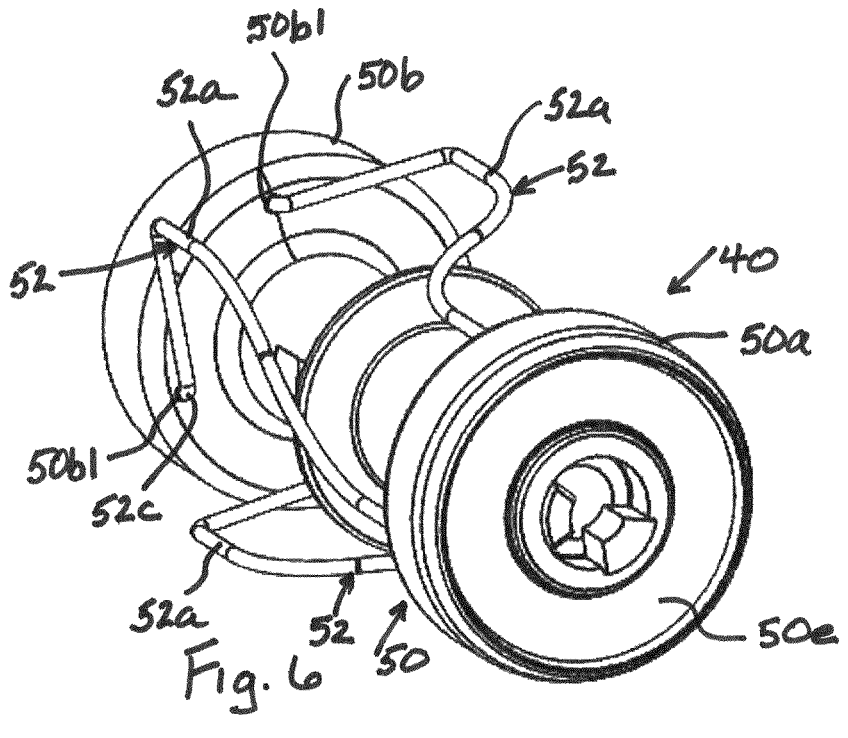
FIGS. 6-7 show perspective views of a label supply roll hub.
Figure 7:
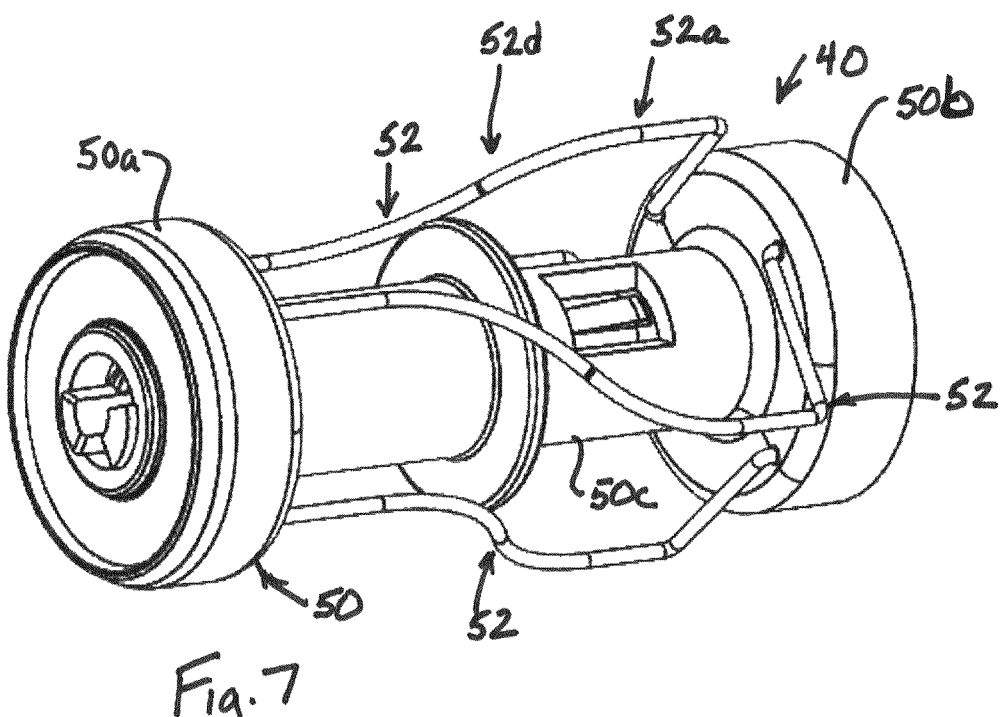

FIG. 5 shows, along an elevation view looking into the cassette and outward from the cassette station, a label stock path 36 for label stock roll 38 on a label supply roll hub 40, where the label stock includes a liner that is taken up on a take-up reel or hub 42. The label supply roll hub 40 is uniquely configured to facilitate use with various roll core sizes.

In this regard, the label supply roll hub 40 includes a hub body 50 a plurality of wireform members 52 positioned on the hub body 50. Each wireform member 52 is configured such that at least a core engaging portion 52a of the wireform member is pressed radially inward when engaged by a label supply roll core 60 sliding axially onto the label supply roll hub 40. Each wireform member 52 is configured to apply radially outward pressure against the label supply roll core after the core engaging portion 52a is pressed radially inward.

The hub body 50 includes an end part 50a and an end part 50b spaced apart from the end part 50a, with a shaft portion 50c extending therebetween. Each wireform member 52 extends from the end part 50a to the end part 50b. Here, the end part 50a includes a plurality of axial openings 50a1 therein, the end part 50b includes a plurality of axial openings 50b1 therein, and each wireform member includes one end portion 52b engaged within one of the openings 50a1 and an opposite end portion 52c engaged within one of the openings 50b1. A main portion 52d of each wireform member runs from end portion 52b to end portion 52c, and the core engaging portion 52a is part of the main portion 50d. The hub body, including end parts 50a and 50b may be of molded plastic, and the wireform members 52 may be attached to the hub body 50 after formation of the hub body (e.g., by inserting the end parts of the wireform members into the openings 50a1, 50b1). Typically, the wireform member will be inserted into axial opening 50b1 first, and then twisted to position the leg 52c1 as desired and as needed to insert the other end of the wireform into opening 50a1. In embodiments, the wireform members may be of a metal material, such as stainless steel, having a diameter of 1.4 mm, but variations are possible. In implementations, the wireform members are designed to create at least a threshold spring force when the wireform members are under load of the largest acceptable core diameter.

Figures 10, 11, 12:
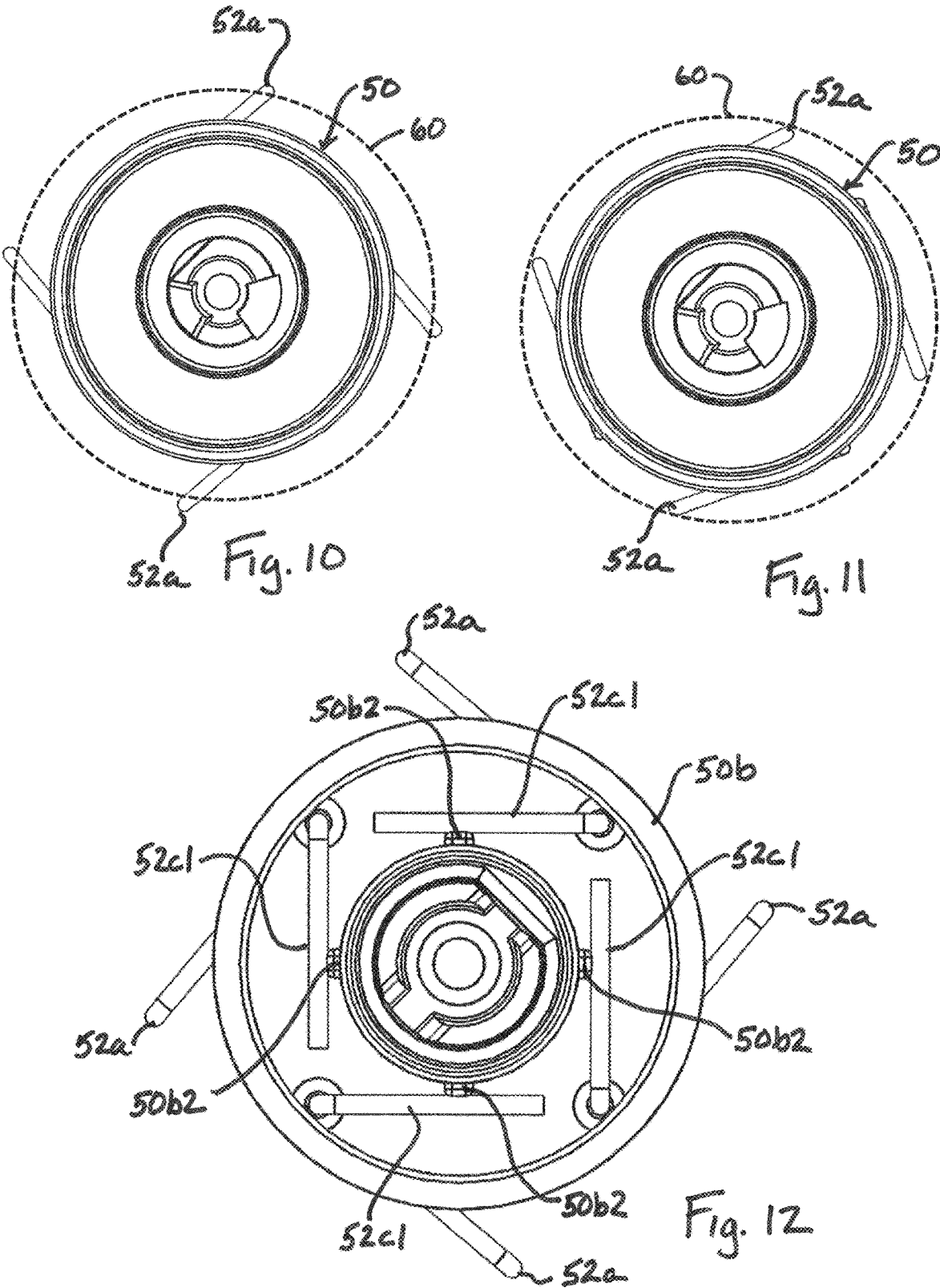
FIG. 10 shows an axial end elevation view prior to shifting of the wireform members.
FIG. 11 shows an axial end elevation view after shifting of the wireform members by a roll core.
FIG. 12 is an axial end view showing spring leg segments of the wireform members.

Notably, the end portion 52c includes a spring leg segment 52c1 that seats against a portion 50b2 of the end part 50b when the core engaging portion 52a of the wireform member is pressed radially inward (e.g., per FIG. 12). Therefore, the spring leg segment 52c1 urges the core engaging portion 52a back radially outward, so that it will apply pressure against the inner surface of the core of the label supply roll.

End part 50a is at a roll load end of the label supply roll hub 50. The main portion 52d of the wireform member includes a segment 52d1 that is located toward the end part 50a and that, in resting or normal position, is located radially inward of an external diameter of the end part 50a. The main portion 52d also includes a segment 52d2 that is positioned toward the end part 50b and that, in resting or normal position, is located radially outward of the external diameter of the end part 50a. Thus, the segment 52d1 comprises the core engaging portion 52a. Notably, the main portion 52d of the wireform member 52 curves both radially outward and in a circumferential direction in a region of transition from the segment 52d1 to the segment 52d2.

Figure 8:
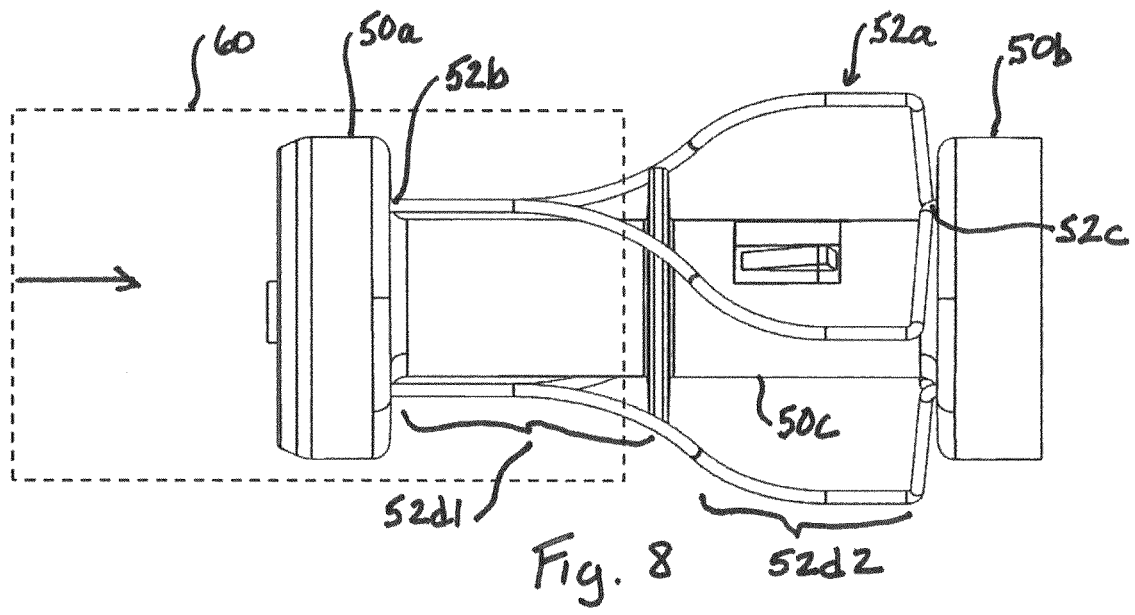
FIGS. 8-9 show elevation views as a roll core is moved onto the label supply roll hub.
Figure 9:
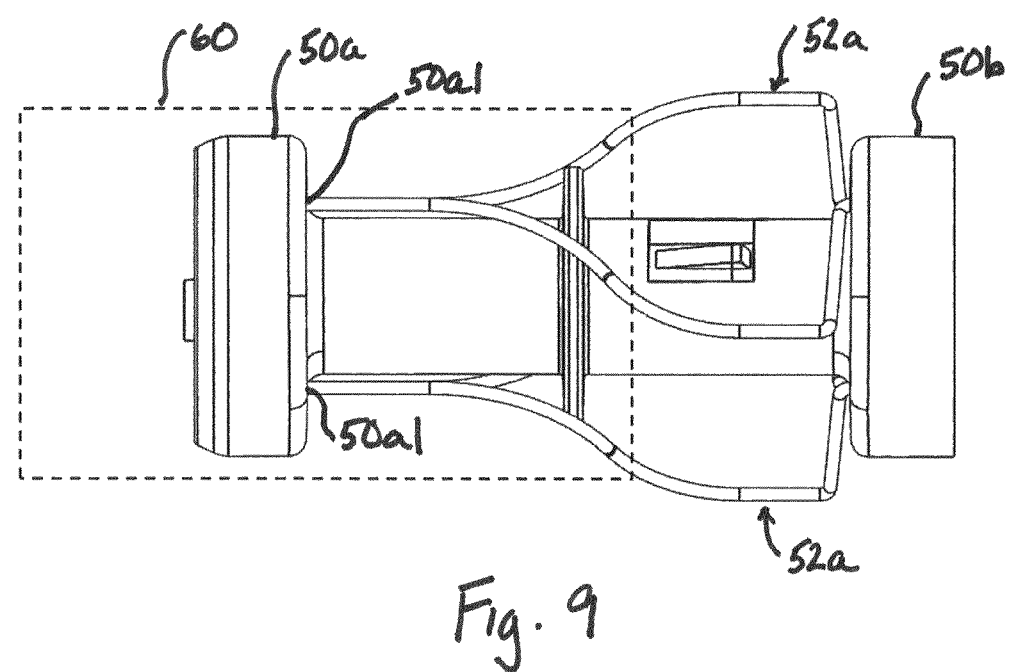

As per FIGS. 8-9, this configuration allows the label supply roll core 60 to initially move axially onto the label supply roll hub 50, without interference from the wire form members 52 (FIG. 8). When the label supply roll core 60 reaches the region of transition (FIG. 9), the roll core 60 will apply forces against the core engaging portion 52a that will force the core engaging portion to rotate circumferentially and move radially inwardly, against the counterforce applied by the spring leg segment 52c1. Once the roll core 60 is moved axially to the end of the label supply roll hub 50, the pressure applied by the wireform members will axially retain the label supply roll on the label supply roll hub, and cause both the label supply roll and the label supply roll hub to rotate as label stock is drawn off of the label supply roll.

The described system provides a plastic moulded hub 50 with features (e.g., the openings 50a1 and 50b2) to capture the metal wireforms 52. The wireforms are installed into the hub and the ends may capped off by press-in caps 50e. The hub 50 is then installed into the cassette 30, onto a wall mounted shaft that allows the hub 50 to spin freely. The wireforms 52 have a resting or normal position that creates regions with a larger diameter than the largest label supply roll inner core diameter that can be accepted. When a label supply roll core is installed, it slides over the wireforms 52 until it hits the angled area (regions of transition) when the core then starts to depress the wireforms and apply pressure. The core is slid completely onto the hub until it bottoms out on the cassette wall and the wireforms apply pressure to the inside of the core, preventing it form slipping. The core and the label media now move with the rotation of the hub about the wall mounted shaft. When all the media has been used, the label core can be pull off the hub and the wireforms will spring back to the unloaded position.

This label supply roll hub configuration allows for various sized core inner diameters to be installed onto the hub giving the end user more flexibility in the label media they choose to order for the printer. The wireforms also have a longer life and preform better under loading of extended periods of time making them more reliable than previously known hubs.

It is to be clearly understood that the above description is intended by way of illustration and example only, is not intended to be taken by way of limitation, and that other changes and modifications are possible. For example, while the above-described embodiment if focused on a printer in the form of a scale, the system could be implemented on printers that do not include scale functionality. Moreover, while the label supply roll hub described above is part of a cassette, the label supply roll hub could be connectable directly to the printer body, in cases where a cassette is not used.

Still other variations are possible.

The invention claimed is:

1. A printer, comprising:

a label supply roll hub;

a media path along which label stock is movable;

a printhead positioned along the media path;

wherein the label supply roll hub comprises a hub body and at least one wireform member positioned on the hub body and configured such that at least a core engaging portion of the wireform member is both rotated circumferentially and pressed radially inward when engaged by a label supply roll core sliding axially onto the label supply roll hub, wherein the wireform member is configured to apply radially outward pressure against the label supply roll core after the core engaging portion is pressed radially inward;

wherein the hub body includes a first end part and a second end part spaced apart from the first end part, wherein the wireform member extends from the first end part to the second end part;

wherein the first end part includes a first axially extending opening therein, the second end part includes a second axially extending opening therein, and the wireform member includes a first end portion engaged within the first axially extending opening, a second end portion engaged within the second axially extending opening and a main portion running from the first end portion to the second end portion, wherein the core engaging portion is part of the main portion;

wherein the second end portion includes a spring leg segment having a side surface region that seats against a radially extending portion of the second end part when the core engaging portion of the wireform member is pressed radially inward, such that the spring leg segment urges the core engaging portion radially outward.

2. The printer of claim 1, wherein the first end part is at a roll load end of the label supply roll hub, wherein the main portion of the wireform member includes a first segment that is located radially inward of an external diameter of the first end part, and a second segment that is located radially outward of the external diameter of the first end part, wherein the second segment comprises the core engaging portion.

3. The printer of claim 2, wherein the first segment is positioned toward the first end part, and the second segment is positioned toward the second end part.

4. The printer of claim 2, wherein the main portion of the wireform member curves both radially outward and in a circumferential direction in transition from the first segment to the second segment.

5. A label supply roll hub for use in a printer, the label supply roll hub comprising:

a hub body;

at least one wireform member positioned on the hub body and configured such that at least a core engaging portion of the wireform member is both rotated circumferentially and pressed radially inward when engaged by a label supply roll core sliding axially onto the label supply roll hub, wherein the wireform member is configured to apply radially outward pressure against the label supply roll core after the core engaging portion is pressed radially inward;

wherein the hub body includes a first end part and a second end part spaced apart from the first end part, wherein the wireform member extends from the first end part to the second end part;

wherein the first end part includes a first axially extending opening therein, the second end part includes a second axially extending opening therein, and the wireform member includes a first end portion engaged within the first axially extending opening, a second end portion engaged within the second axially extending opening and a main portion running from the first end portion to the second end portion, wherein the core engaging portion is part of the main portion.

6. The label supply roll hub of claim 5, wherein the hub body includes a first end part and a second end part spaced apart from the first end part, wherein the wireform member extends from the first end part to the second end part.

7. The label supply roll hub of claim 6, wherein the first end part includes a first axially extending opening therein, the second end part includes a second axially extending opening therein, and the wireform member includes a first end portion engaged within the first axially extending opening, a second end portion engaged within the second axially extending opening and a main portion running from the first end portion to the second end portion, wherein the core engaging portion is part of the main portion.

8. The label supply roll hub of claim 7, wherein the second end portion includes a spring leg segment having a side surface region that seats against a radially extending portion of the second end part when the core engaging portion of the wireform member is pressed radially inward, such that the spring leg segment urges the core engaging portion radially outward.

9. The label supply roll hub of claim 8, wherein the first end part is at a roll load end of the label supply roll hub, wherein the main portion of the wireform member includes a first segment that is located radially inward of an external diameter of the first end part, and a second segment that is located radially outward of the external diameter of the first end part, wherein the second segment comprises the core engaging portion.

10. The label supply roll hub of claim 9, wherein the first segment is positioned toward the first end part, and the second segment is positioned toward the second end part.

11. The label supply roll hub of claim 9, wherein the main portion of the wireform member curves both radially outward and in a circumferential direction in transition from the first segment to the second segment.

* * * * *